(12) United States Patent
Xiang et al.

(10) Patent No.: US 10,780,994 B2
(45) Date of Patent: Sep. 22, 2020

(54) LEADING-EDGE STRUCTURE, PASSENGER BOARDING BRIDGE FLOOR STRUCTURE AND PASSENGER BOARDING BRIDGE

(71) Applicants: China International Marine Containers (Group) Ltd., CIMC R&D CENTER, Shenzen, Guangdong (CN); Shenzhen Cimc-Tianda Airport Support Ltd., Shenzen, Guangdong (CN)

(72) Inventors: Wei Xiang, Shenzhen (CN); Yuwu Chen, Shenzhen (CN); Lei Shi, Shenzhen (CN); Jianming Huang, Shenzhen (CN); Chong Dai, Shenzhen (CN)

(73) Assignees: China International Marine Containers (Group) Ltd., Shenzhen, Guangdong (CN); Shenzhen Cimc-Tianda Airport Support Ltd., Shenzhen, Guangdong (CN)

( * ) Notice: Subject to any disclaimer, the term of this patent is extended or adjusted under 35 U.S.C. 154(b) by 0 days.

(21) Appl. No.: 16/265,426

(22) Filed: Feb. 1, 2019

(65) Prior Publication Data
US 2019/0161210 A1    May 30, 2019

Related U.S. Application Data

(63) Continuation of application No. PCT/CN2016/092834, filed on Aug. 2, 2016.

(51) Int. Cl.
*B64F 1/305* (2006.01)
*E01D 19/12* (2006.01)

(52) U.S. Cl.
CPC ............ *B64F 1/3055* (2013.01); *B64F 1/305* (2013.01); *E01D 19/125* (2013.01)

(58) Field of Classification Search
CPC ....... B64F 1/305; B64F 1/3055; E01D 19/125
(Continued)

(56) References Cited

U.S. PATENT DOCUMENTS 3,639,934 A * 2/1972 Eggert, Jr. .............. B64F 1/305
                                                                    14/71.5
3,641,604 A * 2/1972 Eggert, Jr. ............ B64F 1/3055
                                                                    14/71.5
(Continued)

FOREIGN PATENT DOCUMENTS

CN         1712310 A       12/2005
CN         1915746 A        2/2007
(Continued)

OTHER PUBLICATIONS

PCT/CN2016/092834 ISR, dated Apr. 11, 2017.
(Continued)

*Primary Examiner* — Raymond W Addie
(74) *Attorney, Agent, or Firm* — Mei & Mark, LLP (57) ABSTRACT

A leading-edge structure of a passenger boarding bridge floor includes a protruding assembly, a protruding guide structure and an energy storage assembly. Under action of the protruding guide structure and the energy storage assembly, the protruding assembly may be protruded or contracted relative to the passenger boarding bridge floor body. The protruding assembly may automatically adjust according to the position of the airplane, under the action of limiting and guiding of the protruding guide structure, the protruding assembly may be adaptively protruded or retracted relative to the passenger boarding bridge floor body, so as to improve the safety of the airplane.

19 Claims, 10 Drawing Sheets

(58) Field of Classification Search
  USPC .......................................................... 14/71.5
  See application file for complete search history.

(56) References Cited

U.S. PATENT DOCUMENTS

| | | | | |
|---|---|---|---|---|
| 3,693,204 | A * | 9/1972 | Eggert, Jr. | B64F 1/305 |
| | | | | 14/71.5 |
| 3,722,017 | A * | 3/1973 | Gacs | B64F 1/3055 |
| | | | | 14/71.5 |
| 3,843,987 | A * | 10/1974 | Lodjic | B64F 1/305 |
| | | | | 14/71.5 |
| 4,333,195 | A * | 6/1982 | Lichti | B64F 1/305 |
| | | | | 138/118 |
| 5,267,368 | A * | 12/1993 | Saunders | B64F 1/305 |
| | | | | 135/132 |
| 5,853,150 | A * | 12/1998 | Kuchenbrod | B64F 1/30 |
| | | | | 244/137.2 |
| 6,055,692 | A * | 5/2000 | Pell | B64F 1/305 |
| | | | | 14/71.5 |
| 7,269,871 | B2 * | 9/2007 | Koch | B64F 1/305 |
| | | | | 14/71.5 |
| 8,104,129 | B2 * | 1/2012 | Tang | B64F 1/305 |
| | | | | 14/71.5 |
| 9,003,589 | B2 * | 4/2015 | Gutkuhn | B64F 1/305 |
| | | | | 14/71.5 |
| 2002/0100128 | A1 | 8/2002 | Tholen et al. | |
| 2016/0193093 | A1 | 7/2016 | Ryle et al. | |

FOREIGN PATENT DOCUMENTS

| | | |
|---|---|---|
| CN | 101117157 A | 2/2008 |
| CN | 201457740 U | 5/2010 |
| CN | 102991705 A | 3/2013 |
| WO | 2016038761 A1 | 3/2016 |
| WO | WO2018023366 | 2/2018 |

OTHER PUBLICATIONS

PCT/CN2016/092834 Opinion, dated May 3, 2017.
Extended European search report dated Mar. 20, 2020, in International Application No. PCT/CN2016092834.

* cited by examiner

LEADING-EDGE STRUCTURE, PASSENGER BOARDING BRIDGE FLOOR STRUCTURE AND PASSENGER BOARDING BRIDGE

CROSS-REFERENCE TO RELATED APPLICATIONS

The present disclosure is a continuation of International Application No. PCT/CN2016/092834, filed on Aug. 2, 2016, and titled "LEADING-EDGE STRUCTURE OF PASSENGER BOARDING BRIDGE FLOOR, PASSENGER BOARDING BRIDGE FLOOR STRUCTURE AND PASSENGER BOARDING BRIDGE," the entire contents and subject matter thereof are incorporated herein by reference.

TECHNICAL FIELD

This disclosure relates to a passenger boarding bridge technique, and in particular, to a leading-edge structure of the passenger boarding bridge floor. The present disclosure also relates to a passenger boarding bridge floor structure having the leading-edge structure and a passenger boarding bridge having the same.

BACKGROUND

A passenger boarding bridge is an elevating passageway for connecting a waiting hall to an airplane, having one end connected to a boarding gate of the airport and the other end lapping the cabin door of an airplane, thereby allowing the passengers to step into the airplane through the passenger boarding bridge. The passenger boarding bridge disclosed herein comprises improvements that may greatly improve the operational efficiency of the airport.

At present, a passenger boarding bridge used for an airport generally includes a movable floor that forms a hard contact with the airplane. It may be appreciated that while the passenger boarding bridge approaches the airplane, an operation error or malfunction of a touch-stop button, or some other unintended condition, may cause the passenger boarding bridge to rapidly move into contact with the airplane, such that the airplane is jeopardized and may even injure the passengers inside the airplane. In addition, after the passenger boarding bridge has lapped on the airplane, passengers getting off the airplane or cargo being unloaded from the airplane reduces the weight of the airplane, causing the cabin door of the airplane to ascend to different extents. As the cabin door rises, the portion of the cabin door in contact with the passenger boarding bridge may suffer sufficient pressure so as to cause damage. Likewise, when the passenger boarding bridge has already been lapped on the airplane, passengers boarding the airplane or the cargo being loaded into the airplane will increase the weight of the airplane, causing the cabin door of the airplane to descend to different extents. As the cabin door lowers, a larger gap will be formed between the cabin door and passenger boarding bridge, causing passengers or workers to more easily suffer accidents, for example, falling over or falling from the gap, when they pass through the gap.

SUMMARY

An embodiment of the present disclosure provides a leading-edge structure mounted on a front end edge of a passenger boarding bridge floor, wherein, the leading-edge structure of the passenger boarding bridge floor includes a protruding assembly configured to be protruded or retracted relative to the passenger boarding bridge floor body, wherein the leading-edge of the protruding assembly may directly contact one side of a cabin door of an airplane; a protruding guide structure between the protruding assembly and the passenger boarding bridge floor body configured to limit and guide protruding or retracting movement of the protruding assembly; and an energy storage assembly, configured to store energy while the protruding assembly retracts relative to the passenger boarding bridge floor body, and release energy while the protruding assembly protrudes relative to the passenger boarding bridge floor body.

According to one embodiment, the leading-edge structure of the passenger boarding bridge floor further includes a cab apron, the cab apron further comprising a first end elastically hinged on the protruding assembly and a second end lapped on a passenger boarding bridge floor; wherein a length of the cab apron is larger than a maximum protruded distance of the protruding assembly.

According to one embodiment, an elastic pressing mechanism is mounted between the cab apron and the protruding assembly, the elastic pressing mechanism including a connector that is connected to the first end of the cab apron and a first elastic member between the connector and the rear end of the protruding assembly, or a connector that is connected to the rear end of the protruding assembly and a first elastic member between the connector and the cab apron.

According to one embodiment, the protruding assembly includes a flexible body attached to a fixed mount; wherein the flexible body is the front end edge of the protruding assembly; and the flexible body and the fixed mount extend together.

According to one embodiment, the protruding assembly further includes a support; the flexible body comprises a rear abutting part and a front abutting part; the support and the fixed mount are respectively arranged on two sides opposite to each other of the rear abutting part; the support is connected with the fixed mount via at least one fastener such that the support clamps the rear abutting part and fixes the flexible body onto the fixed mount.

According to one embodiment, the protruding guide structure comprises a hinge assembly, the hinge assembly comprising a first member and a second member, each of which comprises a first end and a second end; the first end of the first member is hinged to the protruding assembly; the first end of the second member is hinged to the second end of the first member; the second end of the second member is hinged to the passenger boarding bridge floor.

According to one embodiment, the protruding guide structure further comprising a four-bar linkage structure; the four-bar linkage structure includes a first bar, a second bar and a limiting bar, each of which includes a first end and a second end, the first end of the first bar is hinged to the passenger boarding bridge floor, the second end of the first bar is hinged to the first end of the second bar, the second end of the second bar is hinged to the protruding assembly, the first end of the limiting bar is hinged to the second bar excluding end portions of the second bar, and the second end of the limiting bar is hinged to the passenger boarding bridge floor; in the extending direction of the protruding assembly, a second hinged point of the limiting bar is kept a first distance away from the first end hinged point of the first bar for a first distance.

According to one embodiment, the four-bar linkage structure is configured to be near a central portion arrangement of the passenger boarding bridge floor, and the second end of the limiting bar is hinged to the central portion of the passenger boarding bridge floor.

According to one embodiment, the energy storage assembly comprises an elastic member and a first rigid member, each of which comprises a first end and a second end; the first end of the first rigid member is fixed on the protruding assembly, the second end of the first rigid member extends to the passenger boarding bridge floor, the first end of the elastic member is fixed on the second end of the first rigid member, the second end of the elastic member is fixed on the front end portion of the passenger boarding bridge floor, the length of the first rigid member is larger than the maximum protruded distance of the protruding assembly.

According to one embodiment, the elastic member is stretched to store energy while the protruding assembly is retracted; and the elastic member releases energy while the protruding assembly is protruded.

According to one embodiment, the first rigid member is on one end of a protruding assembly and further includes: an additional first rigid member, on the opposite end of the protruding assembly; wherein each first rigid member includes an extension member, which extends in an extending direction of the passenger boarding bridge, and includes a first end and a second end, and the second end of the extension member is fixed on the first end of the second elastic member; a spacer, which has an extending direction that is perpendicular to the extending direction of the extension member, the protruding assembly is fixed on a side surface of the spacer, the first end of the extension member is fixed on the other side surface of the spacer, and the side surface and the other side surface are arranged opposite to each other; and a plurality of second rigid members arranged between the two first rigid members equally, wherein each of the plurality of second rigid members comprises a first end that is fixed on the protruding assembly and a second end that is fixed on the first end of the second elastic member.

According to one embodiment, the leading-edge structure of the passenger boarding bridge floor further comprises a strike limiting switch and a striking plate on and matched with the limiting switch, wherein the striking plate is on the spacer, and one end of the striking plate corresponding to one end of the strike limiting switch is bent upwardly.

According to one embodiment, the leading-edge structure of the passenger boarding bridge floor further comprises a safety assembly, the safety assembly comprising a first end affixed to the protruding assembly and a second end that is affixed to the passenger boarding bridge floor.

According to one embodiment, a passenger boarding bridge comprising the passenger boarding bridge floor structure comprising the leading-edge structure of the passenger boarding bridge floor according to present disclosure.

According to one embodiment, the passenger boarding bridge wherein the passenger boarding bridge floor structure is fixed on the passenger boarding bridge body.

REFERENCE MEMBER LIST 1. protruding assembly;
2. protruding guide structure;
3. energy storage assembly;
4. cab apron;
5. striking plate of limiting switch;
6. anti-collision structure;
11. flexible body;
12. fixed mount;
13. support;
21. hinge assembly;
22. four-bar linkage structure;
211. first member;
212. second member;
221. first bar;
222. second bar;
223. limiting bar;
32. second elastic member;
31. rigid member;
311. first rigid member;
312. second rigid member;
3111. extension member;
3112. spacer;
41. elastic hinged member;
42. elastic pressing mechanism;
L. first distance

DETAILED DESCRIPTION

Typical embodiments embodying features and advantages of this disclosure will be set forth in detail. It should be understood that various modifications may be made on different embodiments of this disclosure without departing from the scope of this disclosure, wherein the description and drawings are used for description but not limited to this disclosure.

The terms "front" and "rear" as used in following embodiments are described with reference to the actual structure of the passenger boarding bridge floor structure. The ordinal terms, such as "first" and "second," used herein are intended to illustrate this disclosure rather than to define order of the components in the embodiments of the present disclosure.

In order to solve the above problem, a primary object of the present disclosure is to provide a leading-edge structure of the passenger boarding bridge floor that may automatically adjust to adapt to the position of the airplane so as to improve safety of the airplane.

A further object of the present disclosure is to provide a passenger boarding bridge floor structure having the leading-edge structure and a passenger boarding bridge having the same, which may automatically adjust according to the position of the airplane to adapt to the airplane, so as to improve safety of the airplane.

Figure 1:
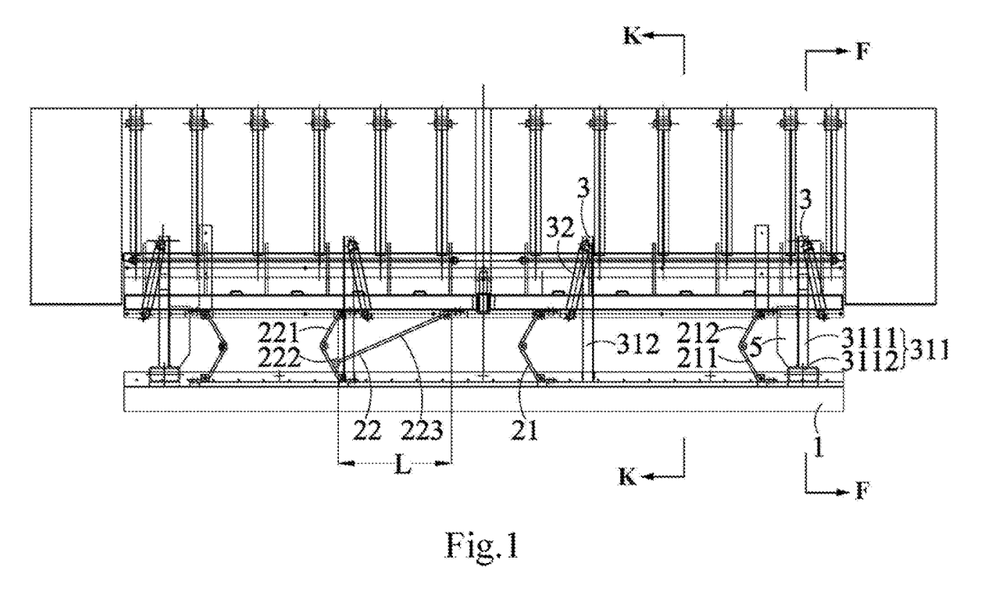
FIG. 1 is a schematic view of a leading-edge structure of a passenger boarding bridge floor in a protruded state according to the present disclosure.
Figure 2:
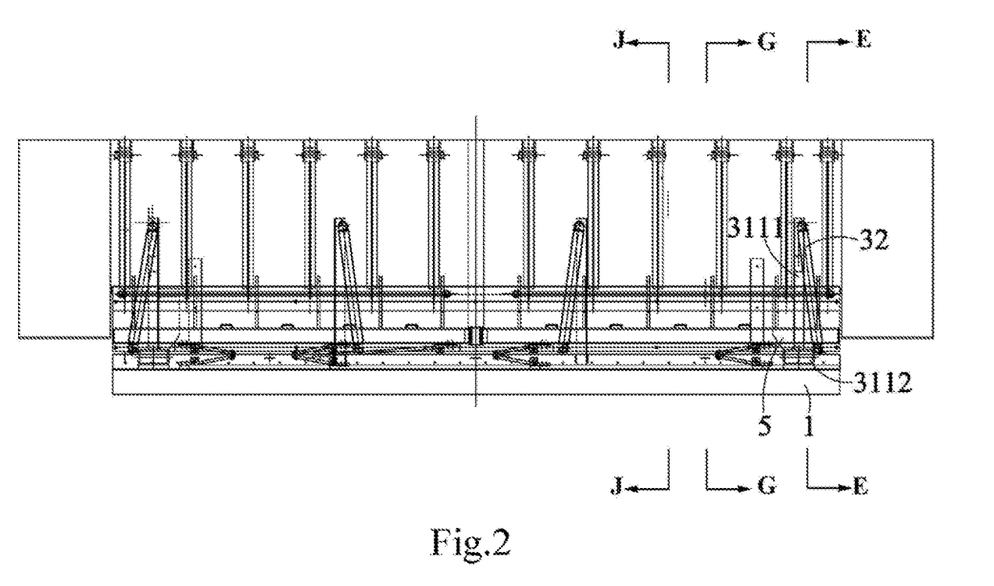
FIG. 2 is a schematic view of the leading-edge structure of the passenger boarding bridge floor in a retracted state according to the present disclosure.
Figure 3:
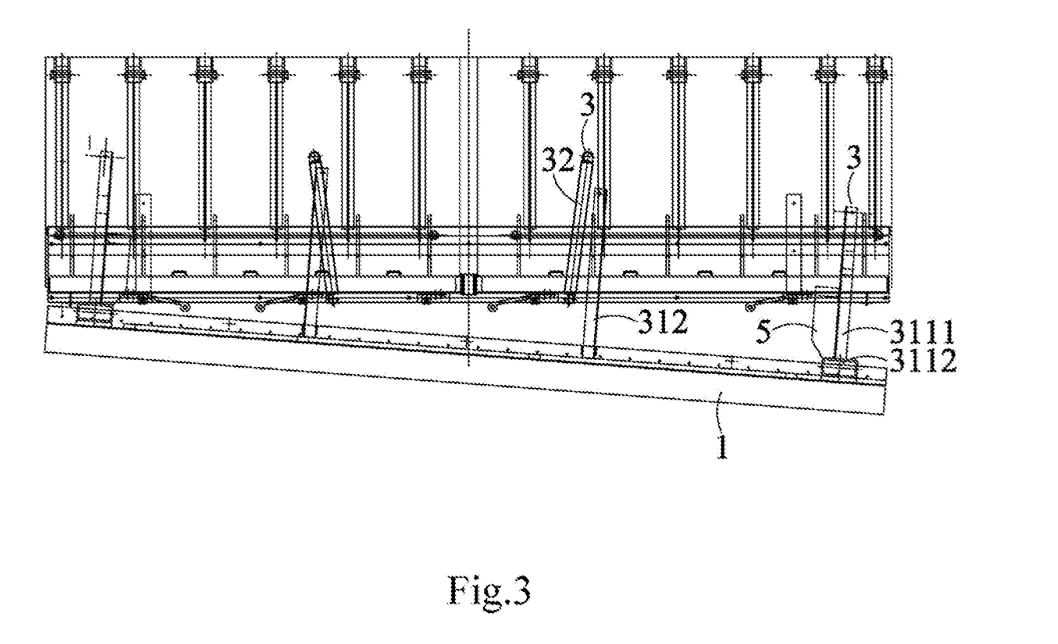
FIG. 3 is a schematic view of the leading-edge structure of the passenger boarding bridge floor in an inclined extended state according to the present disclosure.

An embodiment of the present disclosure provides a leading-edge structure of the passenger boarding bridge floor. The leading-edge structure of the passenger boarding bridge floor is mounted on a front end edge of the passenger boarding bridge floor. It should be noted that an end of the passenger boarding bridge close to a cabin door of an airplane is defined as the front end. Wherein, the leading-edge structure of the passenger boarding bridge floor includes a protruding assembly 1, which may be protruded or retracted relative to the passenger boarding bridge floor body, and the front end edge of the protruding assembly 1 is abutted against one side of the cabin door. Referring to FIG. 1 to FIG. 3, it may be understood that the leading-edge structure of the passenger boarding bridge floor further includes a protruding guide structure 2, which is arranged between the protruding assembly 1 and the passenger boarding bridge floor and limits and guides protruding or retracting movement of the protruding assembly 1. The leading-edge structure of the passenger boarding bridge floor further includes an energy storage assembly 3. The energy storage assembly 3 may store energy while the protruding assembly 1 is retracted relative to the passenger boarding bridge floor body, and the energy storage assembly 3 may release energy while the protruding assembly 1 is protruded relative to the passenger boarding bridge floor body. Under the action of the energy storage assembly 3, the protruding assembly 1 of the leading-edge structure of the passenger boarding bridge floor may press against the cabin door of the airplane, and may automatically protrude or retract according to the position of the airplane. Furthermore, the protruding guide structure 2 may limit movement trajectory of the protruding assembly 1, to avoid unstable movement of the protruding assembly 1 and improve safety of the airplane.

In particular, it may be appreciated from FIG. 1 to FIG. 3 that, for non-limiting example, the protruding assembly 1 is located on foremost end of the leading-edge structure of the passenger boarding bridge floor, and makes first contact with the airplane when the airplane is in contact with the passenger boarding bridge. In the state that the leading-edge structure of the passenger boarding bridge floor is not in contact with the cabin door of the airplane, the protruding assembly 1 is in a completely protruded state, at this time, a distance of the protruding assembly 1 protrudes relative to the passenger boarding bridge floor body is maximum, in such state, the energy storage assembly 3 may be in an un-storage state. At a moment when the leading-edge structure of the passenger boarding bridge floor contacts with the cabin door of the airplane, the protruding assembly 1 may not be retracted, and the energy storage assembly 3 may be maintained in a no energy-storage state. As the airplane continuously approaches the passenger boarding bridge floor, under the action of airplane pressure, the protruding assembly 1 retracts towards the passenger boarding bridge floor, at this moment, the energy storage assembly 3 stores energy. As the airplane departs from the passenger boarding bridge floor, the energy stored in the energy storage assembly 3 acts on the protruding assembly 1, such that the protruding assembly 1 protrudes relative to a floor structure of the passenger boarding bridge, and at this moment the energy storage assembly 3 releases energy.

It may be appreciated that the energy storage assembly 3 may be a spring assembly, a hydraulic cylinder or a pneumatic cylinder and the like, which may store energy while the protruding assembly 1 is retracted and release the stored energy while the protruding assembly 1 is protruded, all within the extent for protection of the present disclosure.

Figure 4:
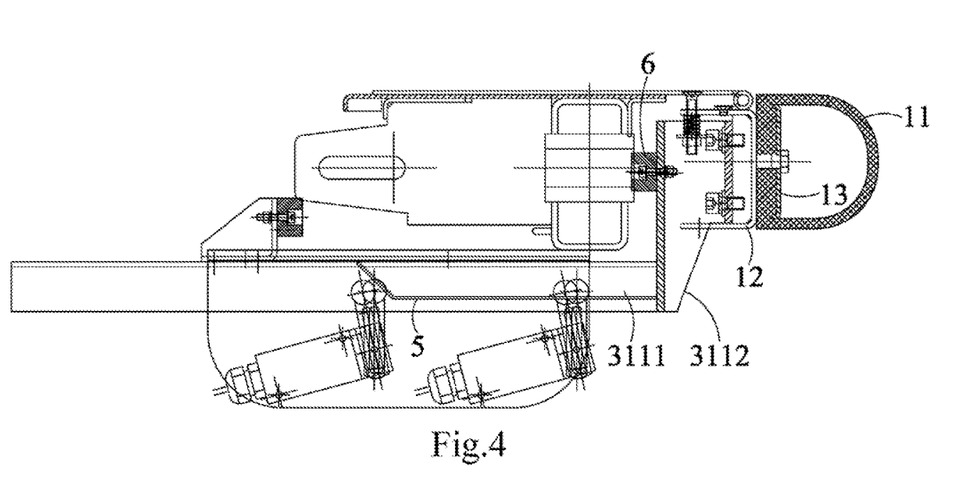
FIG. 4 is an E-E sectional view of the leading-edge structure of the passenger boarding bridge floor in FIG. 2.

In order to further improve safety of the airplane, a cab apron 4 may further be provided between the protruding assembly 1 and a passenger boarding bridge floor body, to form a gap coverage between the protruding assembly 1 and the passenger boarding bridge floor body. As shown in FIG. 4, as one embodiment of the present disclosure, the leading-edge structure of the passenger boarding bridge floor further includes a cab apron 4, in particular, a gap may be formed between the protruding assembly 1 and the passenger boarding bridge floor body when the protruding assembly 1 protrudes with respect to the passenger boarding bridge floor body, and the gap as described above may be covered by the cab apron 4. The cab apron 4 provides support for the passengers or workers when they pass through the gap, to prevent the passengers or workers from falling over, and even from falling from the gap.

More particularly, the cab apron 4 may also include a first end and a second end. The first end of the cab apron 4 is elastically hinged on the protruding assembly 1, and the second end of the cab apron 4 is lapped on the passenger boarding bridge floor. The second end of the cab apron 4 may be adjusted up and down when human body or the weight passes through the cab apron 4, so as to avoid the cab apron 4 from being broken, and further improve the safety of the airplane. It may be appreciated that the length of the cab apron 4 may be arranged to be larger than the maximum protruded distance of the protruding assembly 1, in order to permit the cab apron 4 to cover the gap. As shown in FIG. 4 to FIG. 9, an elastic hinged member 41 is fixedly arranged on the rear end of the protruding assembly 1, for example but not limited to, the first end of the cab apron 4 may be arranged around the elastic hinged member 41. As shown in FIG. 4 to FIG. 9, the sectional shape of the elastic hinged member 41 may be circular, but not limited thereto, the sectional shape of the elastic hinged member 41 also may be ellipse or arc.)

In order to further control the adjustment range of the second end of the cab apron 4, further referring to FIG. 4 to FIG. 9, an elastic pressing mechanism 42 is mounted between the cab apron 4 and the protruding assembly 1. The elastic pressing mechanism 42 includes a connector and a first elastic member. The connector is connected to the cab apron 4 or the rear end of the protruding assembly 1, and the first elastic member is arranged between the rear end of the protruding assembly 1 and the connector or between the cab apron 4 and the connector, for example but not limited to, the first elastic member may be a spring, and the connector may be a bolt and nut assembly. In particular, a through hole is arranged on the corresponding positions of the cab apron 4 and the rear end of the protruding assembly 1, respectively. The bolt passes through the spring through the two through holes, and thereby the bolt matches with the nut, such that the nut is rotated to an appropriate position, and then stops rotation.

It may be appreciated that both ends of the spring may be compressed on the nut and the rear end of the protruding assembly 1, respectively, but not limited thereto, the spring may be arranged on the cab apron 4 and the rear end of the protruding assembly 1 such that the both ends of the spring are compressed on the cab apron 4 and the rear end of the protruding assembly 1. It may be appreciated that the connector may also be a rivet or a member that could be considered by those skilled in the art. The first elastic member may also be a pneumatic spring or a hydraulic cylinder and the first elastic member may store energy when the weight acts on the cab apron 4 and may release energy and restore the cab apron 4 when the weight leaves the cab apron 4, all of which are within the extent for protection of the present disclosure.

In order to further improve the safety of the airplane and prevent the passenger boarding bridge from damaging the airplane, referring to FIG. 4 to FIG. 9, the protruding assembly 1 includes a flexible body 11 and a fixed mount 12. The flexible body 11 is fixed on the fixed mount 12. The flexible body 11 is the front end edge of the protruding assembly 1. The flexible body 11 makes first contact with the airplane while the airplane approaches a leading-edge assembly of the passenger boarding bridge floor. The extending directions of the flexible body 11 and the fixed mount 12 are the same. The flexible body 11 may be a rubber body, a plastic body or a fiber body, and the members that may be deformed during the passenger boarding bridge floor approaches to the airplane, all of which are within the extent for protection of the present disclosure. The flexible body 11 may be fixed on the fixed mount 12, through which the flexible body 11 may be connected to the other members, for example but not limited to, the flexible body 11 may be connected to a protruding guide structure 2 or the energy storage assembly 3 via the fixed mount 12. It may be appreciated that the fixed mount 12 may be a channel steel. The cross-sectional shape of the channel steel may be U-shape, as shown in FIG. 4 to FIG. 9.

Since the flexible body 11 is easily deformed, in order to maintain the flexible body 11 in a certain shape, referring to FIG. 4 to FIG. 9, as one embodiment of the present disclosure, the protruding assembly 1 further includes a support 13 to maintain the protruding assembly 1 in a certain shape. In particular, the flexible body 11 may have a cylindrical structure, for example but not limited to, the side wall of the cylindrical structure may be fixed on the fixed mount 12. In particular, the flexible body 11 includes a rear abutting part and a front abutting part. The support 13 may be protruded into the cylindrical structure, and the fixed mount 12 may be arranged on the outer surface of the cylindrical structure, such that the support 13 and the fixed mount 12 are arranged on both sides opposite to each other of the rear abutting part. It may be appreciated that the support 13 and the fixed mount 12 may be arranged on the inner side and the outer side of the cylindrical structure, respectively.

In addition, it may be appreciated that the support 13 and the fixed mount 12 may be connected with each other by various means of connection, for example but not limited to, the support 13 and the fixed mount 12 may be fixed by a fastener, or a snap structure or by means of welding, all of which are within the extent for protection of this disclosure. For non-limiting example, referring to FIGS. 4-9, the support 13 may be fixed on the fixed mount 12 by at least one fastener, such that the support 13 may clamp the rear abutting part and fix the flexible body 11 on the fixed mount 12. It may be appreciated that the support 13 may be one and extends in an extending direction of the flexible body 11. Besides, it may be appreciated that the support 13 may be in plural, the plurality of support 13 may be equally arranged in the extending direction of the flexible body 11, respectively.

Referring to FIGS. 1-3, as one embodiment of the present disclosure, the protruding guide structure 2 includes a hinge assembly 21. The hinge assembly 21 includes a first member 211 and a second member 212, each of which includes a first end and a second end. The first end of the first member 211 is hinged to the protruding assembly 1. The first end of the second member 212 is hinged to the second end of the first member 211. The second end of the second member 212 is hinged to the passenger boarding bridge floor.

It may be appreciated that a rotary shaft of the hinged assembly 21 may be arranged perpendicularly to the extending direction of the passenger boarding bridge floor, to carry a part of gravity of the protruding assembly 1. It may be appreciated that the hinged assembly 21 may be in plural, the plurality of the hinged assembly 21 may be equally arranged in the extending direction of the protruding assembly 1. As shown in FIG. 1 to FIG. 3, the rotary shaft located between the first member 211 and the second member 212 may be referred as an intermediate rotary shaft. A part of the intermediate rotary shafts may move opposite to each other during the process that the protruding assembly 1 is retracted, so as to prevent the protruding assembly 1 from moving left and right.

Figure 9:
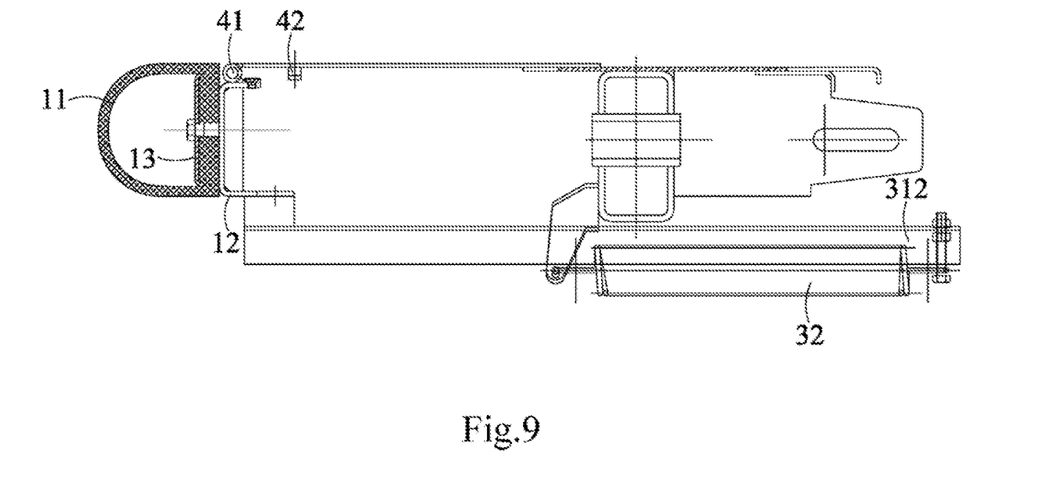
FIG. 9 is a K-K sectional view of the leading-edge structure of the passenger boarding bridge floor in protruded state FIG. 1.

As shown in FIG. 9, a longitudinal section of the first member 211 may be in an I type. A first shaft hole is arranged on the both ends of the first member 211, respectively. A longitudinal section of the second member 212 may be in a H type. Two protruding parts opposite to each other and a notch located between the two protruding parts are formed on the both ends of the second member 212, respectively. A second shaft hole is formed on the two protruding parts, respectively. The second shaft hole is matched with the first shaft hole. The rotary shafts may simultaneously go through the first shaft hole and the second shaft hole. The first member 21 and the second member 212 are respectively rotated around the rotary shaft. The width of the notch of the second member 212 matches with the sectional width of the first member 211.

It may be appreciated that two protruding parts matched with the first end of the first member 211 are formed on the rear end of the protruding assembly 1, and the matching means be as described above, thereby the description may be omitted herein. Besides, it may be appreciated that a plurality of protruding parts may be provided on both ends of the first member 211, and may have the shaft holes formed thereon. In this case, a protruding part matched with the protruding part on the first member 211 may be formed on the protruding assembly 1 or the second member 212, all of which are within the extent for protection of the present disclosure.

In the case that the cabin door of the airplane has a curvature, in order to attach the protruding assembly 1 to the cabin door well, continuously referring to FIGS. 1-3, as one embodiment of the present disclosure, the protruding guide structure 2 further includes a four-bar linkage structure 22. The four-bar linkage structure 22 may cause one point on the protruding assembly 1 to oscillate around one pivot point on the four-bar linkage structure 22, such that the left end and the right end of the protruding assembly 1 protrude for different distances, respectively.

The four-bar linkage structure 22 includes a first bar 221, a second bar 222 and a limiting bar 223, each of which includes a first end and a second end. The first end of the first bar 221 is hinged to the passenger boarding bridge floor, the second end of the first bar 221 is hinged to the first end of the second bar 222, the second end of the second bar 222 is hinged to the protruding assembly 1, the first end of the limiting bar 223 is hinged to the second bar 222 excluding end portions of the second bar, and the second end of the limiting bar 223 is hinged to the passenger boarding bridge floor.

It may be appreciated that the left end and the right end of the protruding assembly 1 may respectively protrude for different distances by means of the four-bar linkage structure 22, and the left and right movement of the protruding assembly 1 may further be limited. A second end hinged point of the limiting bar 223 is distanced from the first end hinged point of the first bar 221 for a first distance L. It may be appreciated that a sum of the length of the first bar 221 and the first distance L is equal to a sum of the length of the second bar 222 between the first bar 221 and the limiting bar 223 and the length of the limiting bar 223, in order to attach the protruding assembly 1 to the passenger boarding bridge floor when the protruding assembly 1 is retracted, but not limited thereto.

Figure 10:
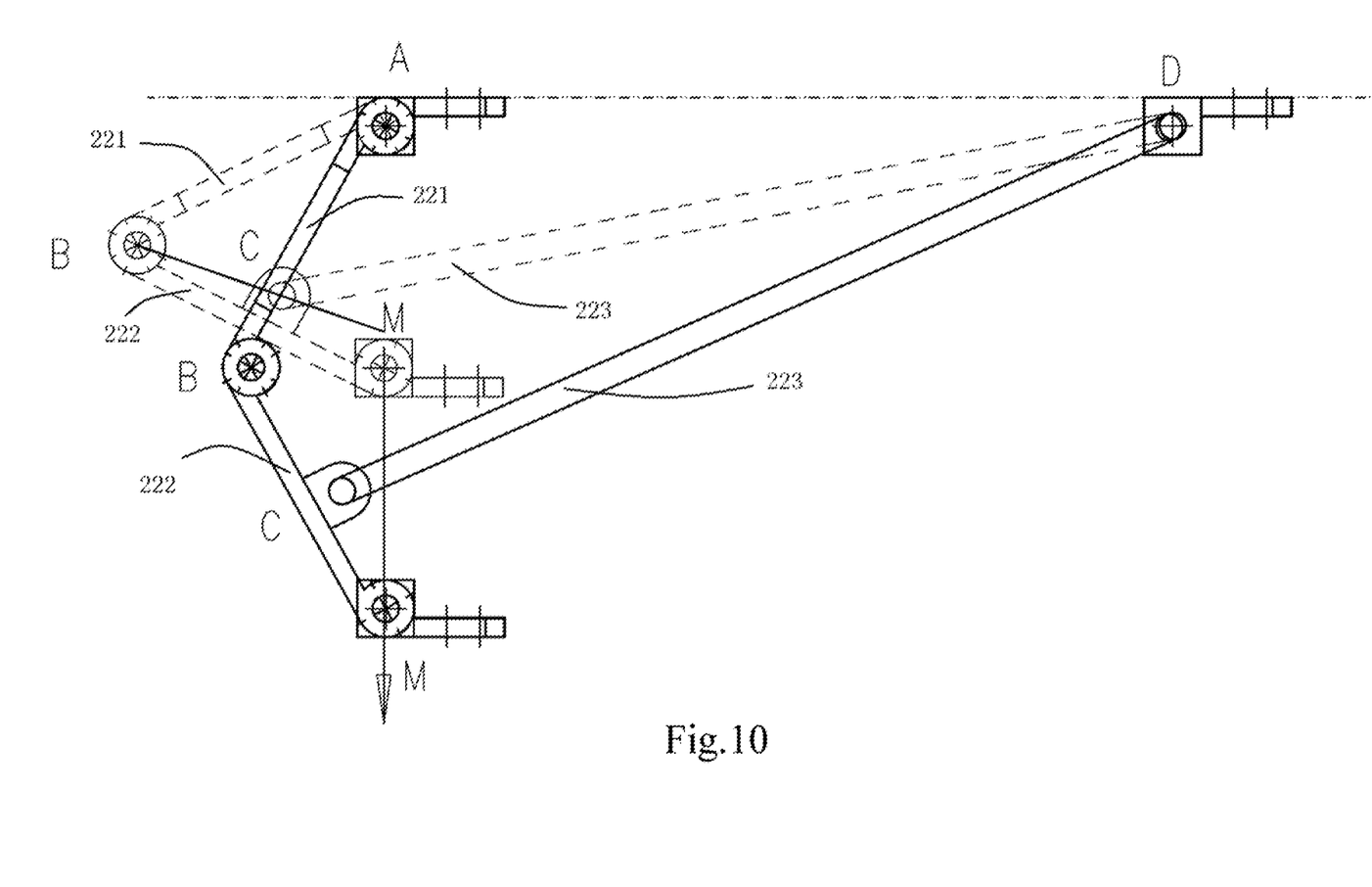
FIG. 10 is a schematic view showing different positions of a four-bar linkage structure according to the present disclosure.

Referring to FIG. 1 and FIG. 10, the protruding assembly 1 may oscillate around the second end of the second bar 222 as a pivot point. The length of the first bar 221 may be AB. The length of the limiting bar 223 may be CD. The second bar 222 is divided into two sections by the first end of the limiting bar 223, and the length of the two sections are BC and CM, respectively, particularly as shown in FIG. 10. Continuously referring to FIG. 10, in the process of the movement of the four-bar linkage structure 22, the second end of the second bar 222 substantially makes a straight line movement, that is, a line section AM coincides with a line section MM, and thereby the protruding assembly 1 hardly makes left and right movement.

Relationships between the bars of the four-bar linkage structure 22 are presented as follows: a value of BC: AB is 0.4 to 0.8; a value of CD: AB is 3 to 3.5; a value of AD: AB is 2.5 to 3; a value of CM: AB is 0.3 to 0.5. A preferable embodiment of the present disclosure is presented as follows: BC: AB=0.56, CD: AB=3.3; AD: AB=2.9; CM: AB=0.4.

The length of the first bar 221, the second bar 222 and the limiting bar 223 may be selected according to situation, for example but not limited to, AB=BM=145 mm, CD=477.5 mm, in addition, the first end hinged point of the limiting bar 223 divides the second bar 222 into two sections of BC=80 mm and CM=65 mm, besides, the first distance L=414 mm, but not limited thereto.

Continuously referring to FIGS. 1-3, for non-limiting example, the hinge assembly 21 may be in plural, and the four-bar linkage structure 22 is one, but not limited thereto, the four-bar linkage structure 22 may also be in plural. Distribution of the hinge assembly 21 and the four-bar linkage structure 22 may be arranged as follows: when there are two the hinged assemblies 21, the four-bar linkage structure 22 is arranged between the two hinged assemblies 21, with the equal distance from the four-bar linkage structure 22 to each of the two hinged assemblies 21, but not limited thereto. The hinge assembly 21 may also be provided on one side of the four-bar linkage structure 22. When there are at least three hinged assemblies 21, the four-bar linkage structure 22 is arranged between any two of the hinged assemblies 21, the distances from the four-bar linkage structure 22 to the adjacent hinged assemblies 21 are the same, and the distance between the adjacent hinged assemblies 21 is equal to the distance from the hinge assembly 21 to the four-bar linkage structure 22.

Continuously referring to FIGS. 1-3, as one embodiment of the present disclosure, the four-bar linkage structure 22 is arranged close to the central part of the passenger boarding bridge floor, and the second end of the limiting bar 223 is hinged to the central part of the passenger boarding bridge floor.

Referring to FIGS. 1-3, FIG. 8, and FIG. 9, as one embodiment of the present disclosure, the energy storage assembly 3 includes a second elastic member 3 and a rigid member 31, each of which includes a first end and a second end. The first end of the rigid member 31 is fixed on the protruding assembly 1, and the second end of the rigid member 31 extends to the passenger boarding bridge floor, and the first end of the second elastic member 32 is fixed on the second end of the rigid member 31, and the second end of the second elastic member 32 is fixed on the front end portion of the passenger boarding bridge floor, and the length of the rigid member 31 is larger than the maximum protruded distance of the protruding assembly 1.

It may be appreciated that the energy storage assembly 3 may be a spring assembly, a cylindrical cylinder or a pneumatic cylinder, and the like that may store energy during the protruding assembly 1 may be retracted and may release the stored energy during the protruding assembly 1 may be protruded, all of which are within the extent for protection of the present disclosure.

Continuously referring to FIGS. 1-3, the second elastic member 32 may be a spring, when all of the protruding assemblies 1 are in the protruded state, the second elastic member 32 may be in a natural state, that is, without being stretched or compressed, in such state, the second elastic member 32 is in a state with no energy storage. The second elastic member 32 is stretched to store energy during the protruding assembly 1 is retracted, and the second elastic member 32 is reset to release energy during the protruding assembly 1 is protruded.

Figure 5:
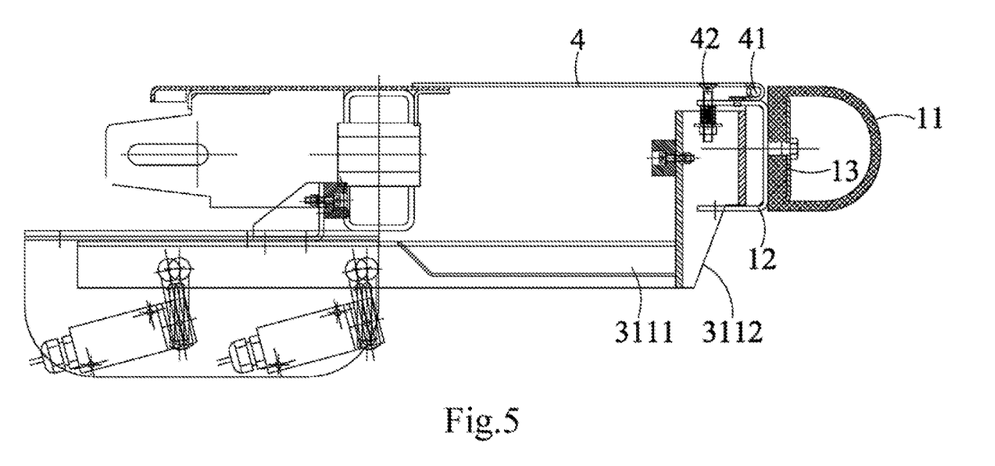
FIG. 5 is a F-F sectional view of the leading-edge structure of the passenger boarding bridge floor in FIG. 1.
Figure 6:
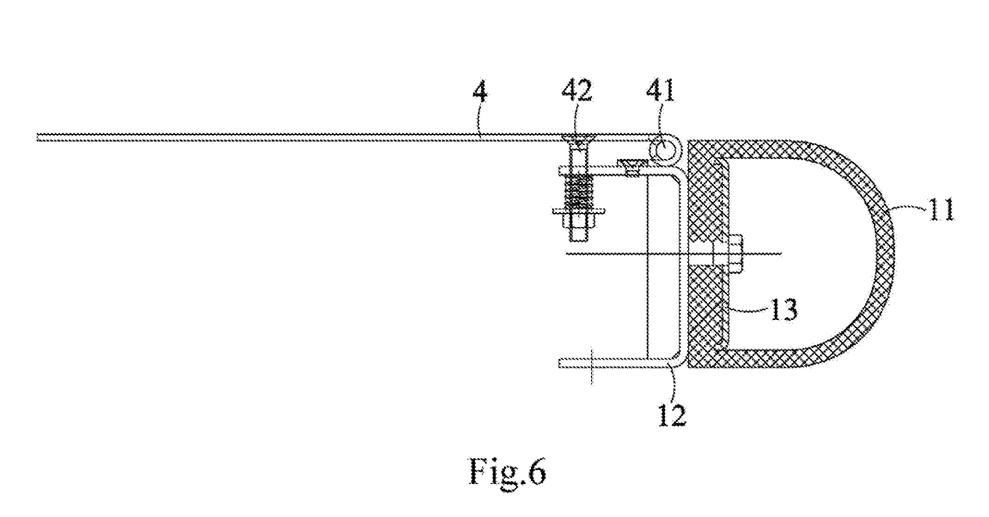
FIG. 6 is a G-G sectional view of the leading-edge structure of the passenger boarding bridge floor in FIG. 2.
Figure 7:
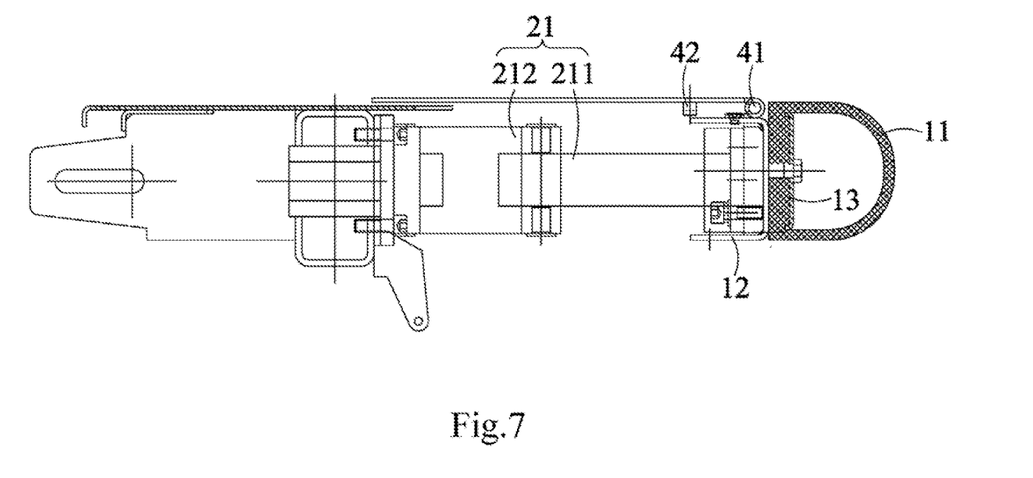
FIG. 7 is a sectional view of a hinge assembly according to one embodiment of the present disclosure.
Figure 8:
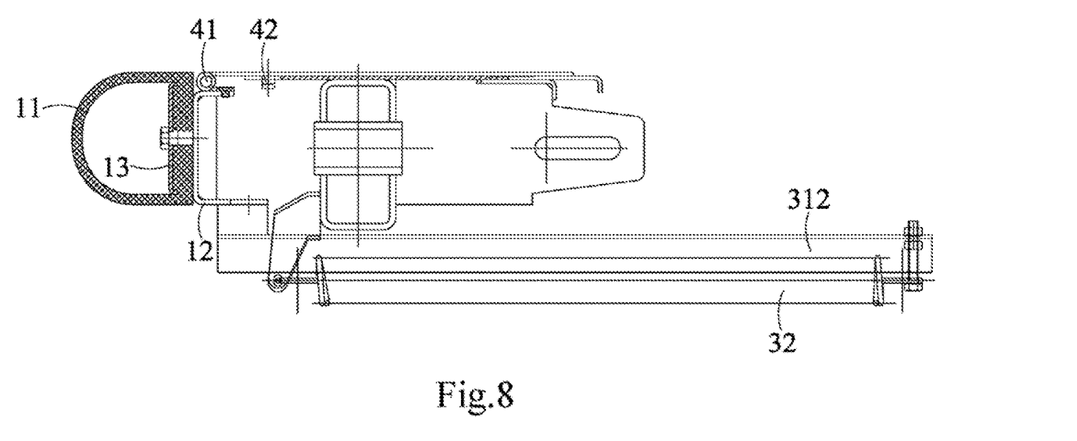
FIG. 8 is a J-J sectional view of the leading-edge structure of the passenger boarding bridge floor in FIG. 2.

Referring to FIG. 4 and FIG. 5, as one embodiment of the present disclosure, the rigid member 31 includes first rigid members 311. There are two first rigid members 311, which are respectively arranged on both ends of the protruding assembly 1, wherein, the first rigid member 311 includes an extension member 3111. The extension member 3111 extends in an extending direction of the passenger boarding bridge. The extension member 3111 includes a first end and a second end. The second end of the extension member 3111 is fixed on the first end of the second elastic member 32. The extending direction of a spacer 3112 is perpendicular to the extending direction of the extension member 3111. The protruding assembly 1 is fixed on the side surface of the spacer 3112, the first end of the extension member 3111 is fixed on the other side surface of the spacer 3112, and the side surface and the other side surface are arranged opposite to each other. The rigid member 31 further includes second rigid member 312. There are a plurality of second rigid members 312, which are equally arranged between the two first rigid members 311, wherein the second rigid member 312 includes a first end and a second end; the first end of the second rigid member 312 is fixed on the protruding assembly 1; and the second end of the second rigid member 312 is fixed on the first end of the second elastic member 32. It may be appreciated that, for example but not limited to, the extension member 3111 may be an angle steel. The extension member 3111 may extend in an extending direction of the passenger boarding bridge floor. The spacer 3112 may be a square steel. The extending direction of the spacer 3112 may be perpendicular to the extending direction of the extension member 3111. The first end of the extension member 3111 may be connected by the way of welding and riveting or using a fastener, all of which are within the extent for protection of the present disclosure. The square steel may be connected with the protruding assembly 1 by the way of welding and riveting or using the fastener, all of which are within the extent for protection of the present disclosure.

Continuously referring to FIG. 4 and FIG. 5, as one embodiment of the present disclosure, the leading-edge structure of the passenger boarding bridge floor further includes a strike limiting switch and a striking plate of limiting switch 5, which are matched with each other. The striking plate of limiting switch 5 is arranged on the spacer 3112, and one end of the striking plate of limiting switch 5 corresponding to the strike limiting switch is bent upwardly, to trigger the strike limiting switch.

As one embodiment of the present disclosure, the leading-edge structure of the passenger boarding bridge floor further includes a safety assembly. The safety assembly includes a first end that is fixed on the protruding assembly 1 and a second end that is fixed on the passenger boarding bridge floor.

The present disclosure further provides a passenger boarding bridge floor structure, wherein, the passenger boarding bridge floor structure includes a leading-edge structure of the passenger boarding bridge floor of the present disclosure.

The present disclosure further provides a passenger boarding bridge, wherein the passenger boarding bridge includes a passenger boarding bridge body and the passenger boarding bridge floor structure of the present disclosure, and the passenger boarding bridge floor structure is fixed on the passenger boarding bridge body.

As above described in the technical solution, advantages and effects of the leading-edge structure of the passenger boarding bridge floor according to the present disclosure are presented as follows: the leading-edge structure of the passenger boarding bridge floor includes a protruding assembly that may automatically adjust according to the position of the airplane, under the action of limiting and guiding of the protruding guide structure, the protruding assembly may be adaptively protruded or retracted relative to the passenger boarding bridge floor body, so as to improve the safety of the airplane.

A passenger boarding bridge floor structure and a passenger boarding bridge according to the embodiments of the present disclosure include the leading-edge structure of the passenger boarding bridge floor as described above, such that the passenger boarding bridge floor structure or the passenger boarding bridge may adapt to the position of the airplane to provide safety of the airplane.

Although the present disclosure has been described with reference to several exemplary embodiments, it should be understood that the words that have been used are words of description and illustration, rather than words of limitation. As the present disclosure may be embodied in several forms without departing from the spirit or essential characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A leading-edge structure mounted on a front end edge of a passenger boarding bridge floor, wherein the leading-edge structure of the passenger boarding bridge floor comprises:
   a protruding assembly configured to be protruded or retracted relative to a passenger boarding bridge floor body, wherein the leading-edge of the protruding assembly may directly contact one side of a cabin door of an airplane;
   a protruding guide structure between the protruding assembly and the passenger boarding bridge floor body configured to limit and guide protruding or retracting movement of the protruding assembly;
   wherein the protruding guide structure comprises a hinge assembly, the hinge assembly comprising a first member and a second member, each of which comprises a first end and a second end; the first end of the first member is hinged to the protruding assembly; the first end of the second member is hinged to the second end of the first member; the second end of the second member is hinged to the passenger boarding bridge floor;
   wherein the protruding guide structure further comprises a four-bar linkage structure; the four-bar linkage structure comprising a first bar, a second bar and a limiting bar, each of which comprises a first end and a second end; wherein the first end of the first bar is hinged to the passenger boarding bridge floor, the second end of the first bar is hinged to the first end of the second bar, the second end of the second bar is hinged to the protruding assembly, the first end of the limiting bar is hinged to the second bar excluding end portions of the second bar, and the second end of the limiting bar is hinged to the passenger boarding bridge floor; in the extending direction of the protruding assembly, a second hinged point of the limiting bar is kept a first distance away from the first end hinged point of the first bar for a first distance L; and
   an energy storage assembly, configured to store energy while the protruding assembly retracts relative to the passenger boarding bridge floor body and release energy while the protruding assembly protrudes relative to the passenger boarding bridge floor body.

2. The leading-edge structure of claim 1, wherein the four-bar linkage structure is configured to be near a central portion of the passenger boarding bridge floor, and the second end of the limiting bar is hinged to the central portion of the passenger boarding bridge floor.

3. The leading-edge structure of claim 1, wherein the leading-edge structure further comprises a safety assembly comprising a first end that is fixed on the protruding assembly and a second end that is fixed on the passenger boarding bridge floor.

4. The leading-edge structure of claim 1, further comprising a safety assembly comprising a first end that is fixed on the protruding assembly and a second end that is fixed on the passenger boarding bridge floor.

5. The leading-edge structure of claim 1, wherein the leading-edge structure further comprises a cab apron, the cab apron further comprising a first end elastically hinged on the protruding assembly and a second end lapped on a passenger boarding bridge floor; wherein a length of the cab apron is larger than a maximum protruded distance of the protruding assembly.

6. The leading-edge structure of claim 5, further comprising a safety assembly comprising a first end affixed to the protruding assembly and a second end that affixed to the passenger boarding bridge floor.

7. The leading-edge structure of claim 5, further comprising an elastic pressing mechanism mounted between the cab apron and the protruding assembly; wherein the elastic pressing mechanism comprises a connector that is connected to the cab apron and a first elastic member between the connector and a rear end of the protruding assembly, or a connector that is connected to the rear end of the protruding assembly and a first elastic member between the connector and the cab apron.

8. The leading-edge structure of claim 7, wherein further comprising a safety assembly comprising a first end that is fixed on the protruding assembly and a second end that is fixed on the passenger boarding bridge floor.

9. The leading-edge structure of claim 1, wherein the protruding assembly comprises a flexible body attached to a fixed mount; wherein the flexible body is the front end edge of the protruding assembly; and the flexible body and the fixed mount extend together.

10. The leading-edge structure of claim 9, wherein the protruding assembly further comprises a support; the flexible body comprises a rear abutting part and a front abutting part; the support and the fixed mount are respectively arranged on two opposite sides to each other of the rear abutting part; the support is connected with the fixed mount via at least one fastener such that the support clamps the rear abutting part and fixes the flexible body onto the fixed mount.

11. A leading-edge structure mounted on a front end edge of a passenger boarding bridge floor, wherein the leading-edge structure of the passenger boarding bridge floor comprises:
 a protruding assembly configured to be protruded or retracted relative to a passenger boarding bridge floor body, wherein the leading-edge of the protruding assembly may directly contact one side of a cabin door of an airplane;
 a protruding guide structure between the protruding assembly and the passenger boarding bridge floor body configured to limit and guide protruding or retracting movement of the protruding assembly; and
 an energy storage assembly, configured to store energy while the protruding assembly retracts relative to the passenger boarding bridge floor body and release energy while the protruding assembly protrudes relative to the passenger boarding bridge floor body;
 wherein the energy storage assembly comprises an elastic member and a first rigid member, each of which comprises a first end and a second end; the first end of the first rigid member is fixed on the protruding assembly, the second end of the first rigid member extends in the direction of the passenger boarding bridge floor, the first end of the elastic member is fixed on the second end of the first rigid member, the second end of the elastic member is fixed on the front end portion of the passenger boarding bridge floor, the length of the first rigid member is larger than the maximum protruded distance of the protruding assembly.

12. The leading-edge structure of the passenger boarding bridge floor according to claim 11, wherein the elastic member is stretched to store energy while protruding assembly is retracting; and the elastic member releases energy while the protruding assembly is protruded.

13. The leading-edge structure of the passenger boarding bridge floor according to claim 11, wherein the first rigid member is on one end of a protruding assembly and further comprising:
 an additional first rigid member arranged on the opposite end of the protruding assembly, wherein each first rigid member comprises:
  an extension member, which extends in an extending direction of the passenger boarding bridge, and comprises a first end and a second end, and the second end of the extension member is fixed on the first end of the second elastic member;
  a spacer, which has an extending direction that is perpendicular to the extending direction of the extension member, the protruding assembly is fixed on a side surface of the spacer, the first end of the extension member is fixed on the other side surface of the spacer, and the side surface and the other side surface are arranged opposite to each other; and
 a plurality of second rigid members arranged between the two first rigid members equally, wherein the each of the plurality of second rigid members comprises a first end that is fixed on the protruding assembly and a second end that is fixed on the first end of the second elastic member.

14. The leading-edge structure of claim 13, wherein the leading-edge structure further comprises a strike limiting switch and a striking plate on and matched with the limiting switch, wherein the striking plate is on the spacer, and one end of the striking plate corresponding to one end of the strike limiting switch is bent upwardly.

15. The leading-edge structure of claim 13, further comprising a safety assembly comprising a first end that is fixed on the protruding assembly and a second end that is fixed on the passenger boarding bridge floor.

16. A passenger boarding bridge comprising a passenger boarding bridge body and a passenger boarding bridge floor structure comprising a leading-edge structure; wherein the leading-edge structure comprises:
 a protruding assembly configured to be protruded or retracted relative to a passenger boarding bridge floor body, wherein the leading-edge of the protruding assembly may directly contact one side of a cabin door of an airplane;
 a protruding guide structure between the protruding assembly and the passenger boarding bridge floor body configured to limit and guide protruding or retracting movement of the protruding assembly; and
 an energy storage assembly, configured to store energy while the protruding assembly retracts relative to the passenger boarding bridge floor body and release energy while the protruding assembly protrudes relative to the passenger boarding bridge floor body,
 wherein the protruding guide structure comprises a hinge assembly, the hinge assembly comprising a first member and a second member, each of which comprises a first end and a second end; the first end of the first member is hinged to the protruding assembly; the first end of the second member is hinged to the second end of the first member; the second end of the second member is hinged to the passenger boarding bridge floor;
 wherein the protruding guide structure further comprises a four-bar linkage structure; the four-bar linkage structure comprising a first bar, a second bar and a limiting bar, each of which comprises a first end and a second end; wherein the first end of the first bar is hinged to the passenger boarding bridge floor, the second end of the first bar is hinged to the first end of the second bar, the second end of the second bar is hinged to the protruding assembly, the first end of the limiting bar is hinged to the second bar excluding end portions of the second bar, and the second end of the limiting bar is hinged to the passenger boarding bridge floor; in the extending direction of the protruding assembly, a second hinged point of the limiting bar is kept a first distance away from the first end hinged point of the first bar for a first distance L.

17. The passenger boarding bridge of claim 16, wherein the passenger boarding bridge floor structure is fixed on the passenger boarding bridge body.

18. A passenger boarding bridge comprising a passenger boarding bridge body and a passenger boarding bridge floor structure comprising a leading-edge structure; wherein the leading-edge structure comprises:
- a protruding assembly configured to be protruded or retracted relative to a passenger boarding bridge floor body, wherein the leading-edge of the protruding assembly may directly contact one side of a cabin door of an airplane;
- a protruding guide structure between the protruding assembly and the passenger boarding bridge floor body configured to limit and guide protruding or retracting movement of the protruding assembly; and
- an energy storage assembly, configured to store energy while the protruding assembly retracts relative to the passenger boarding bridge floor body and release energy while the protruding assembly protrudes relative to the passenger boarding bridge floor body;
- wherein the energy storage assembly comprises an elastic member and a first rigid member, each of which comprises a first end and a second end; the first end of the first rigid member is fixed on the protruding assembly, the second end of the first rigid member extends in the direction of the passenger boarding bridge floor, the first end of the elastic member is fixed on the second end of the first rigid member, the second end of the elastic member is fixed on the front end portion of the passenger boarding bridge floor, the length of the first rigid member is larger than the maximum protruded distance of the protruding assembly.

19. The passenger boarding bridge of claim 18, wherein the passenger boarding bridge floor structure is fixed on the passenger boarding bridge body.

* * * * *